Figure 12:
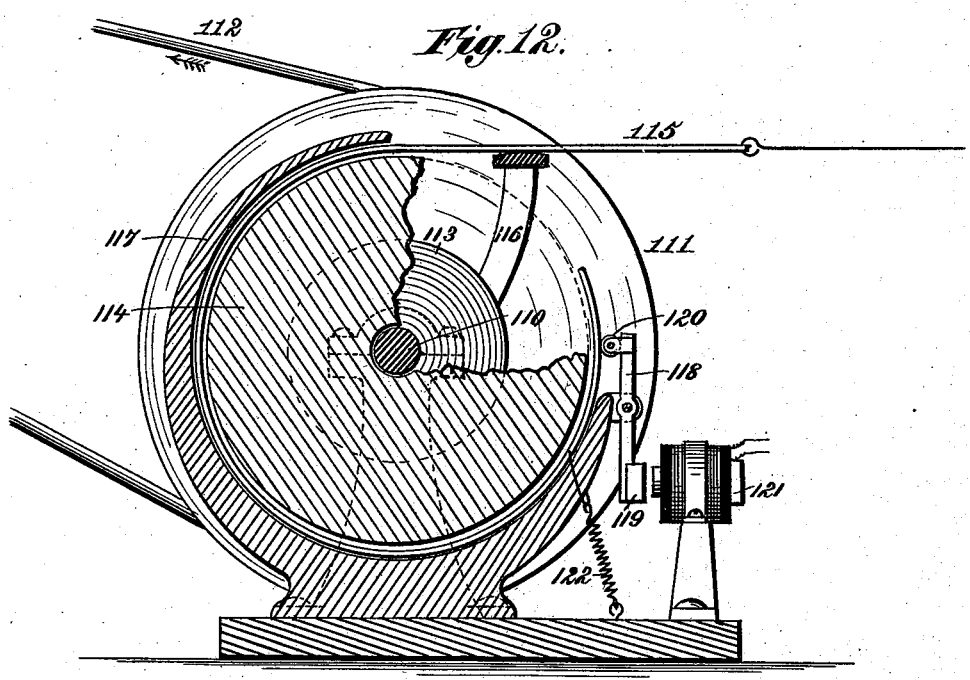

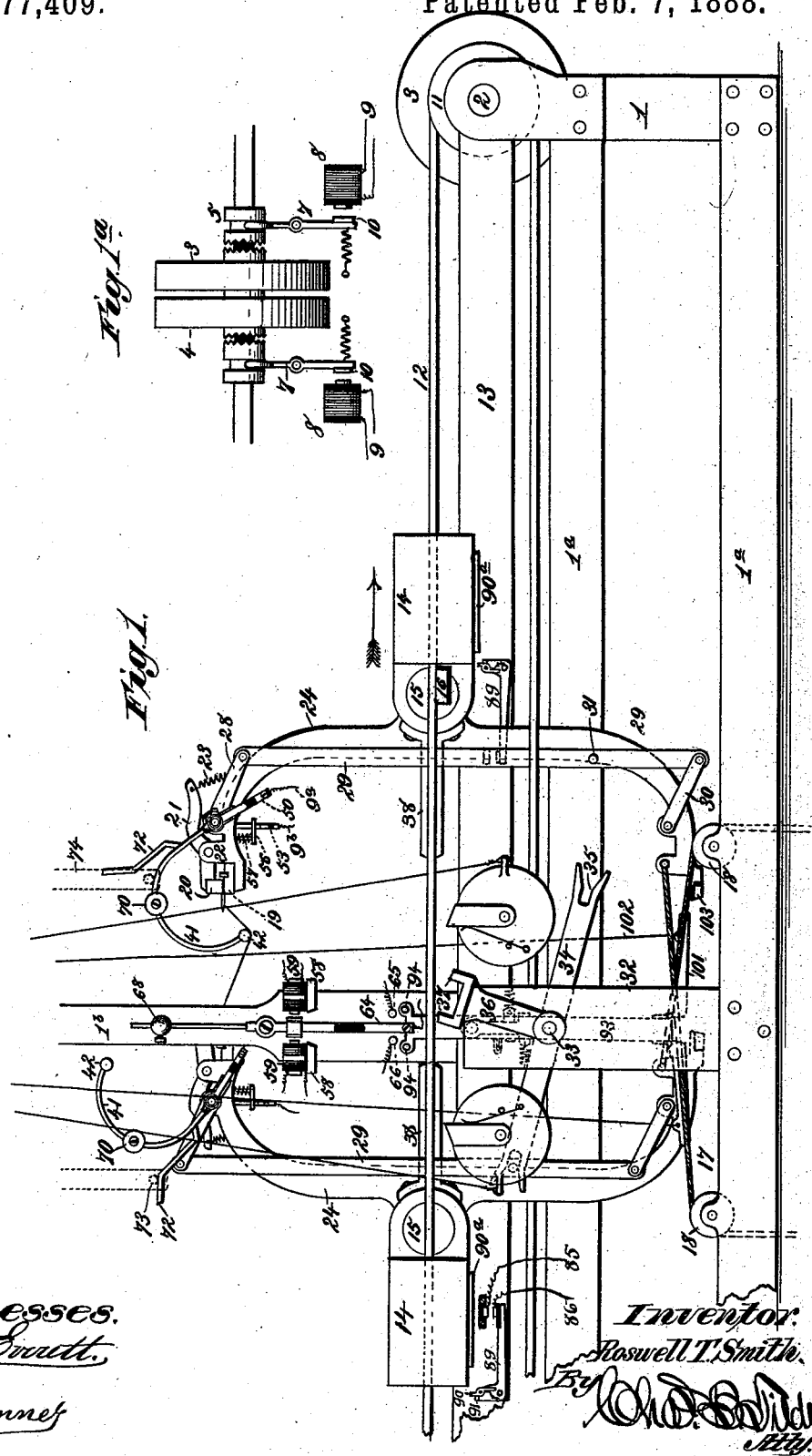

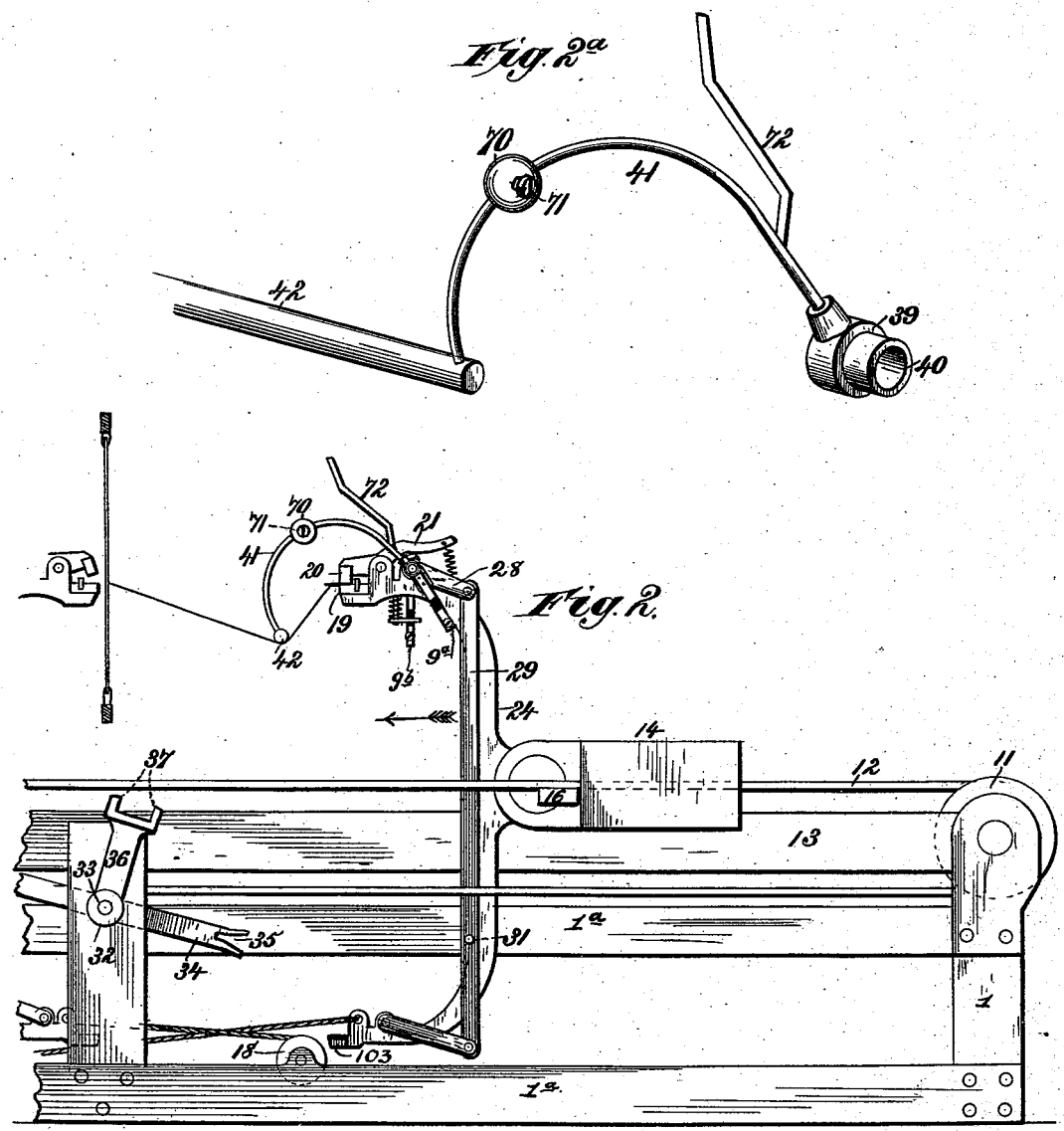

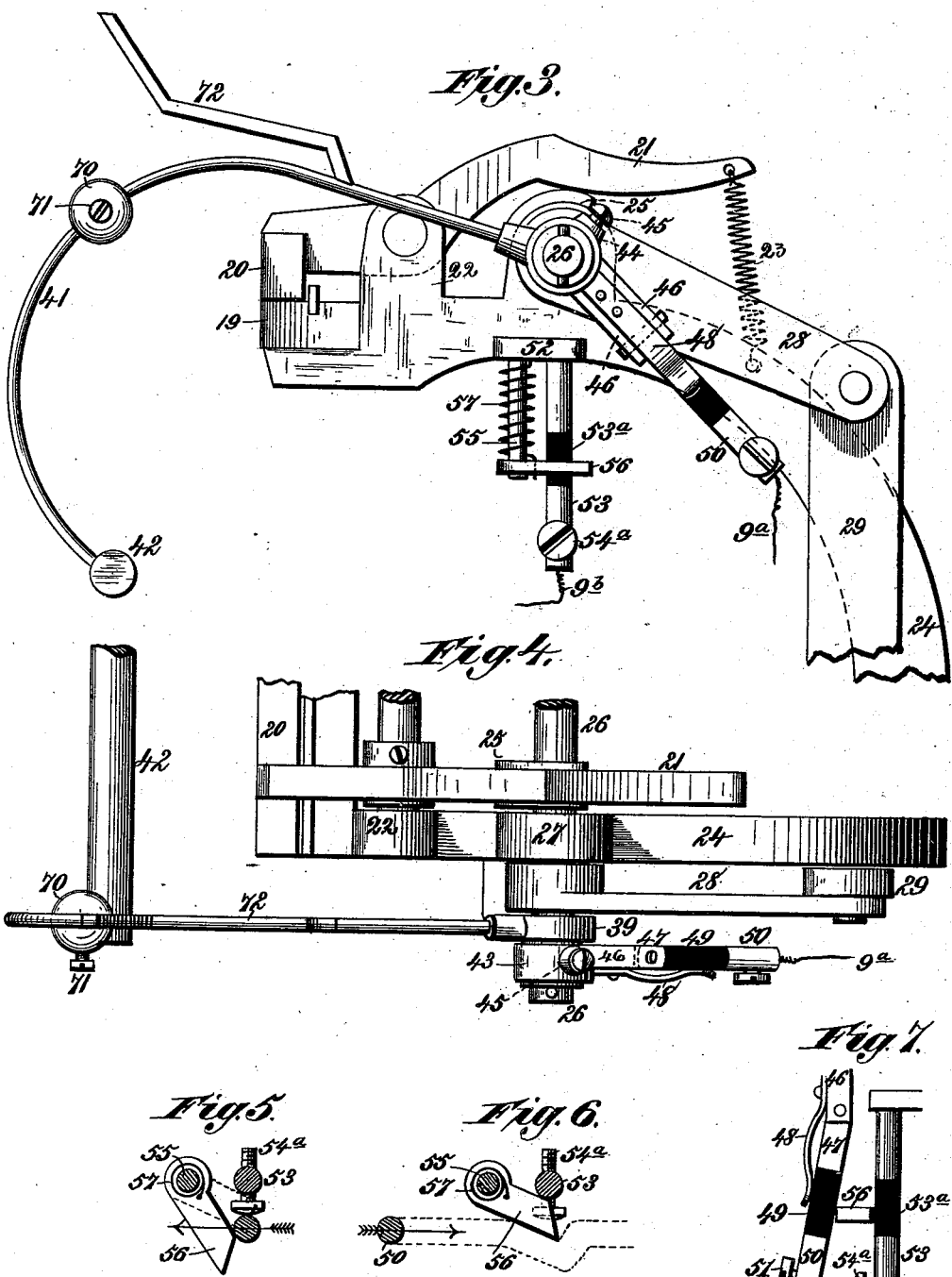

(No Model.) 5 Sheets—Sheet 4.
R. T. SMITH.
EMBROIDERING MACHINE.
No. 377,409. Patented Feb. 7, 1888.
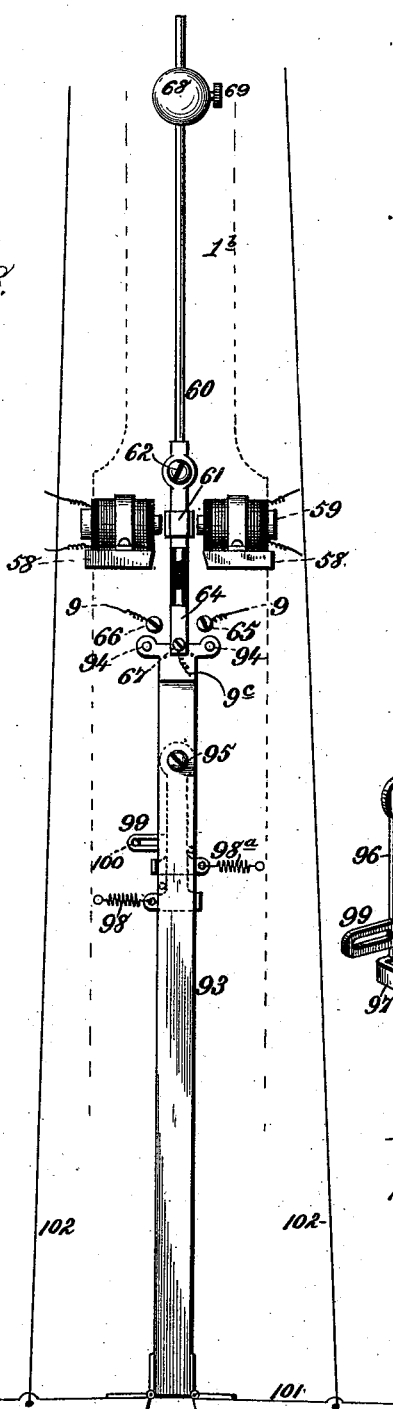
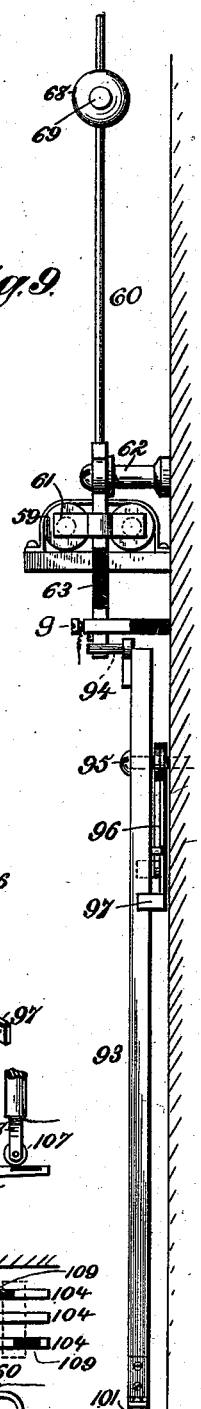
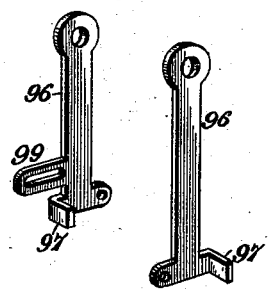
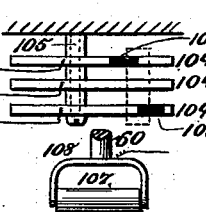

(No Model.) 5 Sheets—Sheet 5.
R. T. SMITH.
EMBROIDERING MACHINE.

No. 377,409. Patented Feb. 7, 1888.

Witnesses.
Robert Emmett.
Arms J. Tanner.

Inventor:
Roswell T. Smith.
By Chas S. Tilden
Atty.

UNITED STATES PATENT OFFICE.

ROSWELL T. SMITH, OF NASHUA, NEW HAMPSHIRE, ASSIGNOR TO HIMSELF, NATE W. GODDARD, OF SAME PLACE, AND GEORGE H. DUNHAM, OF NEW YORK, N. Y.

EMBROIDERING-MACHINE.

SPECIFICATION forming part of Letters Patent No. 377,409, dated February 7, 1888.

Application filed July 9, 1886. Serial No. 207,609. (No model.)

*To all whom it may concern:*

Be it known that I, ROSWELL T. SMITH, a citizen of the United States, residing at Nashua, in the county of Hillsborough and State of New Hampshire, have invented certain new and useful Improvements in Embroidering-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to embroidering-machines, and particularly to that class of such machines shown and described in an application for Letters Patent filed by me upon the 1st day of June, 1885, Serial No. 168,237.

It is the purpose of my present invention to simplify and improve the mechanism whereby the needle-carriages are caused to approach and recede from the web alternately and to render the devices by which the "railway" is reversed capable of accurate and exact automatic action, whereby the said needle-carriages shall be reversed at the instant when the threads are drawn to a predetermined degree of tension.

It is a further purpose of my invention to so organize the mechanism whereby the needle-carriages are moved to and fro as to effect an instantaneous and automatic reversal of such movement by the comparatively inappreciable force required to draw each stitch up to the web. In other words, I propose to effect the reversal of movement of the carriages by the force exerted by the tension of the embroidering-threads, in order that as the work progresses and the threads are consumed the successive reversals shall take place at equal tensions, thereby securing a practical equality in the work throughout and rendering the railway in this class of machines capable of accurate automatic operation.

It is my purpose, also, to render it possible to regulate the tension of the working-threads in such manner as to accommodate the mechanism to embroidery of all kinds, and to accomplish this result by a simple adjustment of one or more of the operative parts.

It is my purpose, also, to simplify and improve the devices for locking and unlocking the needle-clamps, and to render the same automatic and practically simultaneous in action, but to so construct and operate said parts that, in delivering the needles from one carriage to the other, they shall be clamped in the receiving-carriage before they are released by the carriage from which they are taken.

It is also an object of my invention to provide simple means for initiating the movement of the stencil after each passage of the needles, whereby the stitch adjustment of the tambour-frame is automatically effected during the retrograde movements of the needle-carriages.

It is my purpose, finally, to govern the reversals of the railway by the make and break of an electric circuit, the switch being actuated by the tension of the embroidering-threads, whereby the instant the tension reaches a predetermined point the circuit is made and the railway instantly reversed, the successive reversals occurring at equal tension, as already mentioned.

The invention consists in the several novel features of construction and combinations of parts hereinafter fully set forth, and definitely pointed out in the claims following this description.

Figure 13:
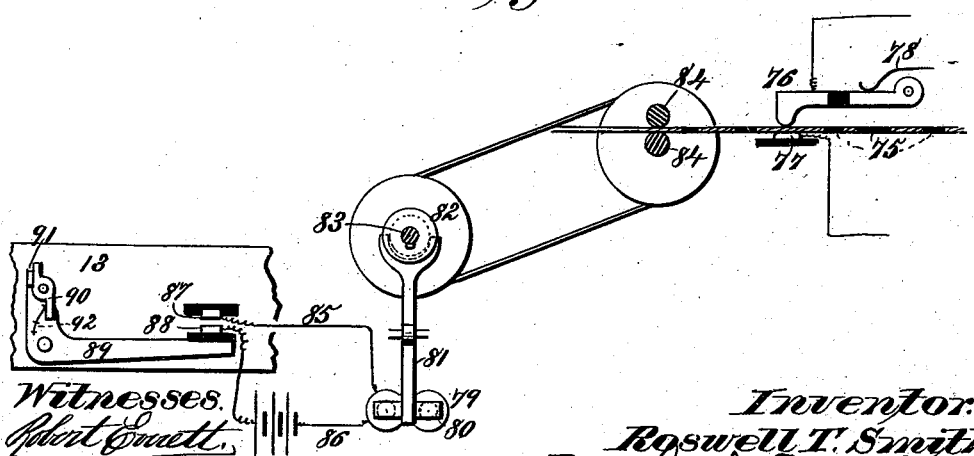

Referring to the drawings forming part of this application, Figure 1 is a side elevation of an embroidering-machine embodying my invention, parts of the apparatus being omitted. Fig. 1ª is a partial side elevation of the power-shaft operating the railway, showing part of the reversing mechanism. Fig. 2 is a partial side elevation, the central standard being removed, as well as the supports for the tambour-frame, to show the latter in its relations to the needle-carriages. Fig. 2ª is a detail perspective of one end of the tension rod or bar. Fig. 3 is a side elevation, on a larger scale, of the head of the needle-carriage, showing the tension-bar and the electrical connections. Fig. 4 is a plan view of Fig. 3, the end of the carriage only being shown. Figs. 5 and 6 are detail plans showing the action of the throw-off, by which electric connection is made by the sweep of the tension-bar in one direction only. Fig. 7 is a detail elevation taken from the rear of Fig. 3, showing the action of the throw-off upon the circuit-breaker. Fig. 8 is a side elevation of the lower part of the central standard of the machine, showing the electrical connections by which the circuit is made between the needle-carriages and the mechanism whereby their movement is reversed, and showing the devices for automatically preventing the needles from piercing the web while the tambour-frame is in motion. Fig. 9 is an elevation taken from the right hand of Fig. 8. Fig. 10 is a detail perspective of the devices for centering the switch-throwing lever shown in Figs. 8 and 9. Fig. 11 is a detail side elevation and plan showing a modified form of the contacts shown in Figs. 8 and 9. Fig. 12 is a vertical section showing the construction of the automatic pulley by which the clutch-levers of the reversing mechanism are actuated. Fig. 13 is a detail vertical section showing the stencil and its immediate connections, and illustrating the battery-circuit by which the movement of the stencil is automatically initiated.

This invention is an improvement upon that shown in my application for patent named above, in which I have shown automatic means for governing and effecting the movements of the tambour-frame and the reversal of the needle-carriages by the make and break of a suitable number of electric circuits controlled by the action of a stencil-sheet having openings, the length and relative arrangement of which determine the degree and time of the successive stitch adjustments of the tambour-frame. I have also shown in said application means for effecting the automatic reversal of the needle-carriages by the tension of the working-threads, as well as mechanism for automatically arresting the approach of the needle-carriages during the movement of the web. I have also shown in said application means for actuating the clutch-levers by which the power-shaft is locked with its reversing-pulleys, as well as various improvements of other character.

My present invention relates, however, to improvements upon those portions of the mechanism above specified, together with their immediate connections, and in the present application I have shown only a sufficient part of the entire apparatus involved to render the description of my novel features of improvement perfectly intelligible to those acquainted with the art of embroidering by the Swiss machines.

In the accompanying drawings, the reference-numeral 1 designates the frame of the machine, which is of substantially rectangular form, having two longer parallel sides, 1ª. Upon the ends of the frame are shafts 2 2, one of which is a power-shaft, having loosely mounted thereon two pulleys, 3 and 4, Fig. 1, geared (one by a straight and the other by a cross belt) to any convenient source of power. Splined to the shaft outside the pulleys are clutches 5 and 6, each operated by a lever, 7, having a fork engaging with the clutch and operated by an electro-magnet, 8, which is introduced into a circuit, 9, adapted to be made and interrupted in the manner hereinafter to be set forth, and exerting, either by the direct attraction of the magnet upon an armature, 10, or by the action of other devices, force enough to throw the clutch and lock the pulley with the shaft. These devices are not essentially dissimilar from the corresponding mechanism shown in my former case.

Upon each of the shafts 2 are mounted pulleys 11, placed at or near the ends of the shafts, and carrying belts 12, which move in parallelism on each of the longer sides of the machine. I have shown in the drawings but one of these belts, as their construction is well known, and they are, moreover, exact duplicates of each other.

From the bearings of the shafts 2, at each end thereof, extend rails 13, which support the needle-carriages in their travel toward and from the tambour-frame. These carriages are mounted on blocks 14, which ride upon the rails 13, and are connected together by a bar, 15, extending across the machine. The belts 12 pass through openings in the blocks 14, as indicated by dotted lines in Figs. 1 and 2, within which they may move freely without disturbing the position of the carriages. Movement is imparted to the latter in one direction by driving-blocks 16, made fast to the belts, and which, upon their engagement with the blocks 14, effect the retrograde movement of the carriages. The movement toward the tambour-frame is effected by the action of weights attached to cords 17, passing over pulleys 18, and connected to any suitable part of the carriages.

Following, as nearly as may be, the order of operation of the mechanism, beginning at the point where the one carriage is arrested in close proximity to the web and the other is about to reach a similar point upon the other side of the web, the first step is the transfer of the needles from the one carriage to the other, involving the automatic unlocking of the clamping-jaws in one and their closing in the other. It is desirable in accomplishing this transfer that there shall be an instant of time in which the needles shall be locked in the needle-jaws of both carriages, and that they shall not be released by the transferring-carriage until they are securely locked in the needle-jaws of the carriage receiving them. To this end I have devised the following mechanism: The double-ended needles are clamped in each carriage by or between a lower stationary jaw, 19, and an upper movable jaw, 20, the former being provided with grooves or V-shaped channels in which the needles lie, as shown in my application already named, the needle-jaws being in essential features similar to those shown in said application. The upper jaw, 20, is mounted on the end of a lever, 21, fulcrumed on a lug, 22, and normally drawn down to throw the jaws open by a spring, 23, attached to the rear end of the lever and to the arm 24 of the carriage. Beneath the rear end of the lever 21 lies a cam, 25, mounted on a rock-shaft, 26, Figs. 3 and 4, which is journaled in lugs 27 on the carriage-arm 24. A lever, 28, rigid on the rock-shaft, actuates the cam, raises the lever 21, throws down the movable jaw, and locks the needles, this result being effected by the downward swing of the lever 28. The end of the lever 28 is pivotally attached to a connecting-bar, 29, having substantially vertical arrangement just outside the carriage-arm 24. This bar is linked at its lower end to the lower part of the carriage by a bar, 30, to preserve its relative position when in action, and is provided with a stud or pin, 31, projecting from its outer face.

In the vertical plane of the tambour-frame is erected a post, 32, upon which is journaled a rock-shaft, 33, carrying a lever, 34, rigid on the shaft and having forks 35 on each end. These levers are mounted on the shaft inside the posts 32, and are therefore arranged in such position that their forked ends are in the same vertical plane as the studs 31 upon the connecting-bars 29. Upon the outer ends of the rock-shaft 33, which project outside the posts 32, are mounted arms 36, at right angles with the levers 34; and each provided with a fork, 37, at its upper end of a size and form to engage with the driving-block 16.

The construction and arrangement of parts on each needle-carriage being the same, and the lever 34 being mounted centrally between the carriages when both are at rest and having the same construction at both ends, the operation is as follows: As the carriage carrying the needles approaches the web at its final increment of movement it engages the stud 31 with the fork 35 on the depressed end of the lever 34, said engagement being fully effected at the instant when the needle-carriage comes to a halt, the stoppage being effected by stops 38 on the carriage, the ends of which abut against the central standard, 1ᵇ, at the instant when the needles are driven through the web on the tambour-frame, and lie with their projecting ends in the needle-channels of the receiving-carriage, their central portions in the web, and their other ends locked in the needle-jaws of the carriage which has just been brought up to the web. The movement of the belt 12 in each direction being continuous, the instant the carriage is arrested the carrier-block 16 leaves the block 14 and begins to travel alone toward its engagement with the corresponding block on the other carriage. Upon its passage it engages with the fork 37 of the arm 36, which is tilted toward the carriage from which the block has just departed, as shown in Fig. 2. Engaging with this fork, it carries the arm 36 with it in the direction shown by the arrow Fig. 2, thereby rocking the shaft 33 and actuating the lever 34. Both the forked ends of this lever being in engagement with the studs 31 upon the connecting-bars 29, respectively—that is to say, the lower end of the lever 34 being engaged with the stud upon the bar 29 of the carriage just arrested, and the upper or higher end of said lever being engaged with the corresponding stud upon the bar 29 of the other carriage—the travel of the block 16, after engagement with the fork 37, reverses the position of the lever 34, raising the connecting-bar 29 upon the carriage carrying the needles, and drawing down the bar 29 upon the carriage which receives them. The cams 25 being alike, and the travel of the cam upon the receiving-carriage being such as to throw the lever 21 upon that carriage and lock the needle-jaws an instant before the corresponding cam upon the other carriage, from which the needles are transferred, releases the needle-clamping lever, it will be seen that for an instant both ends of all the needles are locked in the carriages, and that the needle-jaws of the receiving-carriage have clamped them securely before they are released by the carriage from which they are taken. The driving-blocks 16 now engage with the blocks 14 of the carriage to which the needles have been transferred, drawing said carriage away from the web, and at the same time drawing the working-threads through the fabric. The next step, therefore, in the order of action is to effect the arrest of this retrograde movement of the carriage at the instant when the stitch is drawn into the fabric with the exact degree of tension necessary to completely form it, it being obvious that if the reversal is effected too soon the stitches will be loose, and if too late the threads will be drawn into the fabric and gather it, the work in either case being worthless. It is evident, therefore, that to secure the necessary result the point of reversal must be determined by the tension of the working-threads, and to accomplish this, and to secure the required actions at equal tensions successively, I have devised the following mechanism:

Upon each of the extremities of the shafts 26, which project outside of the arms 24 and levers 28 upon each needle carriage, I mount what is termed a "quill," consisting, substantially, of a sleeved bearing, 39, Figs. 2ᵃ, 3, and 4, which turns loosely and freely upon said shaft, and is provided with a rigid or integral annulus, 40. Upon each part 39 is mounted a curved arm, 41, to the end of which is attached a bar, 42, extending transversely of the machine from the arm 41 on one side to the corresponding arm 41 upon the other end of the needle-carriage. The curve of these arms brings the bar 42 over in front of the needles, and the manner of mounting its supports upon the shaft 26 of the carriage allows the said bar to swing up and down in front of the needles in substantially a vertical arc, for a purpose presently to be shown.

Upon the annulus 40 is mounted a ring, 43, having a boss, 44, through which a set-screw, 45, is tapped, having its end bearing upon the annulus 40, whereby the ring may be locked thereon in any desired position. Formed with or rigidly attached to the ring 43 is a fork, 46, between the ends of which is pivoted an arm, 47, Figs. 3, 4, and 7, which is normally thrown inward toward the end of the carriage by a leaf-spring, 48. In the arm 47 is interposed an insulating portion, 49, the outer end or extremity, 50, being formed of any suitable conducting metal, and provided with a binding-screw, 51, which fastens a wire, $9^a$, Figs. 3, 4, and 7. Depending from a bracket, 52, on the carriage-arm 24 is a binding-post, 53, having a binding-screw, 54, fastening a wire, $9^b$, forming part of the same electric circuit. In front of the conductor 53 is a stud, 55, upon which is pivotally mounted one end of a throw-off, 56, consisting of a button having its end, which extends to or a little past the axis of the conductor 53, beveled off, as shown in Figs. 5 and 6. A spiral spring, 57, coiled on the stud 55, normally holds the beveled end of the throw-off upon the conductor 53 in the position shown in Figs. 3 and 6. The throw-off may be made of non-conducting material; or it may be arranged to bear upon the insulating-base $53^a$ of the binding-post.

Under the construction described it will be seen that a vibration of the tension-bar 42 will be accompanied by a corresponding swing of the arm 47, which will in its movement impinge upon the head of an adjustable contact, $54^a$, tapped into the binding-post 53, and close the circuit at that point. To permit this contact, the insulating portion of the arm 47 strikes the beveled end of the throw-off at the same time that it makes contact with the contact-screw $54^a$, turning the button backward against the tension of the spring 57, as shown in Fig. 5. An instant of contact is sufficient, as will be shown hereinafter, to effect the result proposed, and this contact having been made, the arm 47 sweeps past the binding-post 53 far enough to release the throw-off, which is snapped back to its former position by the tension of the spring 57. As the tension-bar 42 now sinks downward and the arm 47 is carried back toward its original position, it strikes upon the outer edge of the throw-off and is deflected outward, Figs. 6 and 7, thereby making no contact with the contact-point $54^a$.

It will be observed that by rendering the ring 43 adjustable upon the annulus 40 the arm 47 may be adjusted in such manner that it will close the circuit at the contacts 50 and $54^a$ when the tension-bar 42 is at any point in the arc of its movement. The manner of giving movement to the tension-bar 42 will be explained hereinafter.

Upon the central standard of the machine, at any suitable point, are arranged brackets 58, Fig. 8, upon which are placed electro-magnets 59, a space being preserved between the adjacent ends of their cores to admit the interposition of a switch-lever, 60, having an armature, 61, and to permit a suitable vibratory movement thereof. I prefer to arrange the magnets in pairs on each bracket, as shown in Fig. 9, in which case the armature 61 is extended over the cores of both; but I may use a single magnet instead.

The switch-lever 60 is pivotally mounted on a stud, 62, projecting from the standard. Below the pivot is a hard-rubber portion, 63, by which the conducting portion 64 is insulated. This portion of the switch-lever vibrates between two binding-posts, 65 and 66, mounted on the standard and properly insulated, and to them are attached wires 9, forming a part of the circuits in which the electro-magnets 8 are placed. Upon the insulated tip 64 is placed a binding-screw, 67, by which a wire, $9^c$, is attached, the electrical connections being more fully described hereinafter.

That portion of the switch-lever 60 which extends above the pivot 62 is provided with an adjustable weight, 68, held in place on the lever by a set-screw, 69, by which the switch-lever is held by a positive force at one end or the other of its arc of vibration.

Each of the magnets 59 lies in a battery-circuit, of which the wires $9^a$, Fig. 3, and contacts 50 and $54^a$ form a part. It is evident, therefore, that when the circuit is made by the switch 50 upon the adjustable contact $54^a$ the magnets 59 upon that side of the standard $1^b$ which are in circuit-connection with the said contacts will be vitalized, thereby causing their cores to attract the armature 61 and tilt the switch-lever 60, bringing its lower or contact point, 64, into engagement with one of the binding-posts 65 or 66, whereby the following results are produced.

The wires 9, leading from the binding-posts 65 and 66, form part of the two circuits in which the electro-magnets 8 are interposed. One wire of each magnet may be connected with the poles of a distinct battery, or, if preferred, a single battery may serve for both magnets. The other wires of the coils are led to the binding-posts 65 and 66. The wire $9^c$, Fig. 8, carried by the switch 64, is connected to the opposite pole of the battery, or if two separate batteries are used the connection is made by a split, in any known manner. Thus by vibrating the switch 64 into engagement with each of the binding-posts 65 66 alternately the circuit of each magnet 8 will be made in turn and the magnet vitalized, causing it to attract the armature 10 and throw the clutch 5 or 6, according to which one of the circuits is made. The clutch locks its pulley to the shaft 2, and as the pulleys 3 and 4 revolve in opposite directions the shaft is reversed at the instant each circuit is made, or practically so. After the vitalization of either of the magnets 59, and after the lever 60 has been vibrated thereby, the weight 69 retains the switch 64 on the contact 65, (or 66,) with which it has been engaged. Thus the circuit remains made until the moment arrives for a succeeding reversal of the shaft 2.

It will be understood that the magnets 59 upon one side of the switch-lever 60 are vitalized by the action of the switch mounted upon the carriage upon the same side of the web, though the opposite arrangement might be made operative.

The tension-bars 42 rest upon the embroidering-threads, as shown in Figs. 1 and 2, and as the carriage recedes from the web and the threads are drawn up into the fabric to form and complete the stitch the threads will bear upon the under face of the tension bar 42 and raise it, the quills 39 turning upon the ends of the shaft 26. At the instant when the threads have been drawn to the required tension the switch 50 sweeps over the contact 54ª, vitalizing the magnets 59 upon that side of the standard, throwing the switch-lever 60, making the contact between switch 64 and one of the binding-posts between which it swings, vitalizing the corresponding magnet, 8, throwing the clutch-lever 7, and reversing the shaft 2, whereupon the needle-carriage is arrested and begins to travel in the opposite direction. The several actions described practically take place in the same moment of time, owing to the instantaneous action of the electric current. In this manner each carriage is reversed alternately at the instant when a thread-tension is produced proportioned to the angle at which the arms 47 are set and locked upon the annuli 40. Not only will each reversal take place at an equal tension, thereby securing a beautiful uniformity in the work produced, but should circumstances require it one carriage may work at a given tension and the other at a different tension.

To aid in the predetermination of the tension at which reversal shall take place, and to enable the operator to give a delicate adjustment of the tension, I provide the curved arms 41 with adjustable weights 70, which may be moved toward or from the point of support 39 and locked in place by a set-screw, 71. As the carriages approach the web closely, the tension-bars are lifted by fingers 72, mounted on the arms 41 and engaging with rigid pins 73, arranged on suitable supports, 74, on each side of the tambour-frame. As the carriages recede, the same pins strike the arms 41 and return them to their former position.

The successive stitch adjustments of the fabric-frame are made substantially in the manner shown in my prior application—that is, by adjusting mechanism which is brought into action by means of a "stencil" having openings of varied length and arrangement, by which the time and degree of the successive adjustments are determined. I may employ the same or essentially the same mechanism in this case, and as it forms no necessary part of my present invention I have shown nothing but the stencil itself with its feeding devices and electrical connections. As in my former case, so in this the stencil is arrested after each stitch adjustment and remains stationary until the stitch is formed and a new adjustment required. It then becomes necessary to initiate the movement of the said stencil in order to cause the interval of non-conducting material which separates the transverse series of perforations to pass over the contact finger or switch and make the circuit by which the clutch-lever is actuated to lock the stencil-driving pulley with the constantly-revolving shaft. This clutch-lever is thrown by either an electro-magnet or by the devices hereinafter described, and as the lever is retracted by a spring like the levers 7, Fig. 1ª, the circuit of the magnet must be made and retained as long as the movement of the stencil is required. I therefore use the same series of perforations, 75, near one edge of the stencil, as in my other case, over which is placed a switch-finger, 76, having proper insulation, and underneath a conducting-bar, 77, so arranged that as the perforations 75 arrive beneath the finger it will snap through the same by the action of a spring, 78, and make contact with the bar 77. The said finger and bar are connected with the opposite poles of a battery, in the circuit of which an electro-magnet, 79, is placed, having its core near an armature, 80, on a clutch-throwing lever, 81, by which a pulley, 82, is locked with a constantly-revolving shaft, 83. This pulley drives the stencil-feeding devices, which may be simple rolls, 84.

With the poles of the same battery, Fig. 13, which vitalizes the magnet 79 are connected wires 85 and 86, leading to a contact, 87, upon an insulated block on the rail 13, and to a second contact, 88, insulated upon the end of a bell-crank, 89, pivoted on the rail 13 in such position as to bring it beneath and near the contact 87. The vertical arm of the bell-crank is provided with a dog, 90, pivoted thereon in such manner that its nose is in the path of a prolonged boss, 90ª, on the bottom of the carriage-block 14. Above its pivotal point and on the side remote from the web the dog 90 bears on the bell-crank arm, and its lower end is acted on by a light spring, 92, to retain it in such position, and at the same time permit it to yield against the direction of the spring-tension. The parts are located at such a point that the needle-carriage must travel far enough to entirely withdraw the needles from the web before the boss 90ª engages the dog. As the carriage recedes from the web, the said engagement takes place, the contacts are brought together, the electro-magnet 79 is vitalized, and the stencil-driving pulley is brought into action. The length of the boss 90ª is such that the contacts 87 and 88 will be held in engagement until the stencil has traveled far enough to drop the finger 76 through the opening in the stencil, whereupon the necessary circuit is made at that point and the other circuit broken by the boss 90ª passing off the dog 90. As the carriage returns, the boss 90ª simply tilts the dog and passes without moving the bell-crank.

The arrangement described is duplicated on both sides of the tambour-frame and is used with both carriages in the same way.

To prevent the needle-carriages from approaching the web so closely as to drive the needles through the web while the latter is moving to complete the stitch adjustment, I pivot upon the standard $1^b$ a lever, 93, having a fork, 94, on its upper end, between which the switch 64 may play and make the required contact with the posts 65 and 66 without striking the fork. The latter is centered relatively to the axes of the bearings 95 of the lever 93 and 62 of the lever 60 by swinging plates 96, pivoted behind the lever 93, and each provided with a finger, 97, engaging with opposite edges of the lever 93. These plates are drawn by springs 98 and $98^a$ in opposite directions, the tension of the spring $98^a$ being somewhat the greater. The plate to which this spring is connected has a slotted arm, 99, engaging with a pin, 100, on the standard, whereby, when the lever is acted on by these springs only, it will be centered by drawing the plate having the arm 99 until the pin 100 rests in the end of the slot, as shown in Fig. 8.

To the foot of the lever 93 are pivoted bars 101, extending in opposite directions and substantially parallel with the rail 13. These bars are supported at an angle with the lever 93 by wires 102, which extend upward, pass over a pulley or pulleys, and connect with the ends of the clutch-lever, by which the stencil-driving roll is locked with its shaft, the arrangement being such that, as in my former application mentioned, when the stencil-pulley is in action, the clutch being thrown, the wires 102 are slackened and the ends of the bars 101 dropped. This brings the ends of said bars into the path of bosses 103 on the lower ends of the carriage-arms 24, Fig. 1, the bars projecting far enough to make such engagement before the needles reach the fabric. As the carriage strikes the bar it vibrates the lever 93. One branch of the fork 94 is thrown against the switch 64, and the circuit of one of the magnets 8 is made, thereby causing an immediate reversal of the needle-carriage. This action will be repeated as long as the tambour-frame is in motion; but when the clutch of the stencil-pulley is thrown off the wires 102 are taken up or tightened, and the bars are raised out of the path of the bosses 103.

Instead of the contacts 64, 65, and 66 shown in Figs. 8 and 9, I may employ those illustrated in Fig. 11. These consist of three separate fingers, 104, fulcrumed on a pivot, 105, and having each a separate weight, 106, by which their ends are thrown upward against a roll, 107, journaled in a fork, 108. The fingers 104 are of conducting metal, and in the outer ones is set an insulating-strip, 109, arranged in different vertical planes, as shown in the plan view, Fig. 11, so that the roller as it passes over them shall be in electrical connection alternately with the central and inner or with the central and outer fingers. The circuit-wires are connected with these fingers in precisely the same way as to the contacts in Figs. 8 and 9, the central finger corresponding to the contact 64 in said figures.

In operating the clutch-levers by which the reversing-pulleys of the shaft 2 are locked with the shaft I may substitute for the armatured levers of Fig. $1^a$ bell-cranks of the kind shown in my earlier case. In this event I operate the bell-cranks by the mechanism shown in Fig. 12, which is an improvement upon the strap and pulley having a friction-slip shown in my said prior application.

The improvements consist as follows: A shaft, 110, is journaled in any suitable support and carries a pulley, 111, by which it is revolved by a belt, 112, from the power-shaft. Upon the shaft are splined or rigidly mounted disks 113, which clasp with frictional contact a pulley, 114, the grip of the disks being close enough to drive the pulley with the desired force. The pulley 114 is not otherwise connected with the shaft, and when any excess of draft is exerted upon its belt it will merely slip between its disks, holding its belt at tension. I use upon this slip-pulley a belt, 115, made, preferably, of heavy leather and carried nearly around the periphery, one end projecting upward in front and unattached and the other passing over a support, 116, and having its end connected to the end of the bell-crank or to a connection of the latter. Partly surrounding the pulley 114 is a casing, 117, upon the front of which is pivotally mounted a lever, 118, having on one end an armature, 119, and on the other an idle-roll, 120, journaled on the lever in close proximity to the outer surface of the free end of the belt 115. An electro-magnet, 121, lying, for example, in the circuit of which the contacts 50 and $54^a$ form part, attracts the armature 119 and throws the roll 120 against the belt. This causes the pulley to engage said belt with a sufficient frictional contact to produce a draft thereon and actuate the bell-crank. When the latter is thrown to its limit of movement, the excess of strain on the belt causes the pulley 114 to slip between its disks, the slip continuing as long as the magnet 121 remains vitalized, thereby holding the lever to its work with a positive and constant force. When the circuit is interrupted, the armature falls off the magnet, releasing the belt. To secure its immediate disengagement from the pulley 114, I attach to the belt, not far below the point where the roll 120 makes engagement, a light spring, 122, having a downward draft on the belt, whereby the belt is thrown off the pulley at the instant of disengagement of the idle-roll 120. The action of the spring also tends to throw the armature 119 off the magnet, though its action is not essential for this purpose.

The casing 117 surrounds the pulley 114, with the exception of an open space near the top. It approaches the periphery of the pulley so closely as to hold the belt 115 quite near and conform it to the surface of the pulley. This prevents the belt from sagging down and drawing its upper part down on the revolving pulley when not in action. Moreover, it prevents the formation of an unnecessary slack in the belt, and by always holding it at the same distance from the pulley the successive actions of the mechanism will be made in substantially equal times.

Instead of the continuous movable needle-jaw 20, as shown, I may use as many separate clamps as there are needles, said clamps being mounted on a single shaft extending from end to end of each carriage. For some reasons this construction is preferable. I may also employ the mechanism by which the carriages are prevented from closely approaching the web while the latter is in motion for the purpose of producing an entire stoppage of the whole machine. This result may be attained without essentially altering the construction of the devices shown and described.

It is evident that I may locate the tension-bars 42 on the carriages or on a wholly separate support without involving change of any essential kind in the arrangement. It is evident, however, that the farther the bar is from the web at the moment of tension the greater will be the angle between the threads and the web, and for this reason I prefer to mount these bars as shown.

In the modified form of switch-connection shown in Fig. 11 the roll, moving on the fingers 104, may be journaled on a support of any kind, whether the same be similar to the switch-lever 60 or a support having rectilinear motion.

It is evident that the means described for effecting the reversal of the railway-carriages may be applied without difficulty to the Heilman or Swiss machines, and that the pantograph used in that class of apparatus may be operated automatically by my stencil, the several movements of the pantograph-index being effected by the application of the principles of the horizontal and vertical threaded shafts thereto. This would require but little change in the old machines, and practically none whatever in the invention described.

I make no claim in this case to those features covered by my application filed June 10, 1885, Serial No. 168,237.

What I claim is—

1. In an embroidering-machine, the combination, with the needle-carriages and their needle-clamping jaws, of cam-levers locking and releasing said jaws, a centrally-fulcrumed lever engaging with the cam-lever connections, and a driving-block on the railway-belt by which the said lever is actuated and the needles locked in the one carriage at or before they are released by the other, substantially as specified.

2. In an embroidering-machine, the combination, with the needle-carriages and their needle-clamping jaws, of levers centrally fulcrumed and arranged, cams locking and releasing the needle-jaws, levers operating the cams, and blocks on the railway-belts by which the said levers are actuated simultaneously in opposite directions by the central levers, substantially as specified.

3. In an embroidering-machine, the combination, with the needle-carriages and the mechanism by which they are alternately moved toward and from the web, of tension-bars resting upon the working-threads, electrical contacts engaged and disengaged by the movement of said bar, electro-magnets lying in the circuits of which said contacts form part, and devices for bringing the reversing mechanism into action, the point of electrical contact being adjustable relatively to the point of elevation of the tension-bars, substantially as specified.

4. In an embroidering-machine, the combination, with the needle-carriages and the mechanism by which they are moved alternately toward and from the web, of tension-bars resting on the working-threads, electrical contacts engaged and disengaged by the movement of said bar, electro-magnets lying in the circuits of which the contacts form part, devices actuated by said magnets for bringing the reversing mechanism into action, means for adjusting the point of electrical contact relatively to the position of the tension-bars and the tension on the threads, and weights on the supports of said bars adjustable toward and from the same to vary the working tension of the threads, substantially as specified.

5. In an embroidering-machine, the combination, with the needle-carriages and the mechanism by which they are moved alternately toward and from the web, of tension-bars resting on the working threads, electrical contacts engaged and disengaged by the movement of said bars, oppositely-arranged electro-magnets lying in the circuits of which such contacts are part, an armatured lever fulcrumed on the standard and swinging to one or other of said magnets, a weight on said lever above its fulcrum, contacts on each side of the insulated end of the lever, a connection therefrom to one pole of the battery, electro-magnets lying in the circuits of which said contacts form part, and devices actuated by said magnets for bringing the reversing mechanism into action, substantially as specified.

6. In an embroidering-machine, the combination, with the needle-carriages and mechanism for moving them toward and from the web, of an electric switch on each carriage, reversing devices actuated by the attraction of magnets lying in the same circuit with each switch, and a separate switch interposed in each reversing circuit, having its magnet energized by closing the switch on the carriage, and adapted to close and maintain said reversing-circuit until the next succeeding reversal, substantially as specified.

7. In an embroidering-machine, the combination, with two separate sets of electro-magnets, of electrical contacts lying in the circuit of one set of said magnets, tension-bars engaging and disengaging said contacts by their rise and fall, a switch having an armature between the magnets of the first set and connected with one pole of the battery of the second set of magnets, contacts connected to the other pole, with which contacts the switch is alternately engaged by the attraction of its armature, and reversing mechanism which is brought into action by making the circuits of said magnets, substantially as specified.

8. In an embroidering-machine, the combination, with the needle-carriages and the mechanism by which the stitch adjustment is effected, of a stencil having openings of varied arrangement and length to control the time and degree of adjustment, stencil-feeding mechanism, devices by which the same is brought into action, an electro-magnet actuating said devices, and contacts lying in the circuit of said magnet and closed by the carriage-block as it recedes, substantially as specified.

9. In an embroidering-machine, the combination, with a contact on the rail, of a movable contact on a lever pivoted to the rail, an electro-magnet in the same circuit, stencil-feeding mechanism, devices actuated by the magnet to bring the feeding mechanism into action, and the needle-carriage riding on the rail to which the contact-lever is pivoted, substantially as specified.

10. In an embroidering-machine, the combination, with the needle-carriage and mechanism by which it is moved to and fro, of a tension-bar resting on the working-threads, a rigid electrical contact on the carriage-arm, a pivoted spring-actuated contact carried by the parts supporting the tension-bar, and a throw-off engaging with the rigid contact and permitting electric connection upon the rise of the tension-bar, substantially as specified.

11. In an embroidering-machine, the combination, with the needle-carriages and mechanism by which they are moved to and fro alternately, of tension-bars resting on the working-threads, an arm or arms connected with said bar and swinging on a pivoted support as the bar rises and falls, an electrical contact pivoted to said arm, a contact-post mounted on the carriage-frame, an adjustable contact-point on said post, and a spring pressing the pivoted contact toward the adjustable one, substantially as specified.

12. In an embroidering-machine, the combination, with the stencil-feeding mechanism and the clutch-lever bringing said mechanism into action, of an electro-magnet actuating the clutch-lever, and electrical contacts engaged by the retrograde movements of the needle-carriages, substantially as specified.

13. In an embroidering-machine, the combination, with a tension-bar resting on the working-threads, of an electrical circuit made by the rise of said bar, an electro-magnet lying in said circuit, reversing mechanism brought into action by the attraction of such magnet, and a switch actuated by a toe on the needle-carriage to close the circuit of the magnet and reverse the carriage to prevent its approach while the web is in adjustment, substantially as specified.

14. In an embroidering-machine, the combination, with a tension-bar resting on the threads, of an electrical circuit made by the rise of said bar, a magnet lying in said circuit, reversing mechanism brought into action by said magnet, and an automatic switch by which the circuit is maintained until the action of the railway is again reversed, substantially as specified.

15. In an embroidering-machine, the combination, with the stencil-feeding mechanism, of devices by which the action of said mechanism is initiated, an electro-magnet actuating said devices, a switch on the rail of the machine by which the circuit is made and broken, and a dog pivoted on said switch and rigid therewith in one direction and yielding in the other, and a prolonged boss on the needle-carriage engaging with and operating the dog and switch after the carriage has traveled a distance from the web, substantially as specified.

16. In an embroidering-machine, the combination, with a tension-bar resting on the working-threads, of an electrical circuit closed by the rise of said bar, a magnet lying in said circuit, a pulley mounted between friction-disks on a revolving shaft, a belt normally loose on said pulley, and a lever actuated by the magnet to bind the belt on the pulley and actuate the same, substantially as specified.

17. In an embroidering-machine, the combination, with the needle-carriages and the needle-clamping jaws, of levers carrying the movable jaw, connecting-bars on each carriage having studs, a centrally-fulcrumed lever midway of the machine having forked ends engaging said studs, a forked bar operating the lever, and a block on the belt actuating the bar, substantially as specified, whereby the jaw on the one carriage is opened as that on the other is closed.

18. In an embroidering-machine, the combination, with the needle-carriages and their needle-jaws, of locking and releasing levers on each carriage, connecting-bars operating said levers in reverse directions, studs on the connecting-bars, a centrally-mounted forked lever engaging said studs as the carriages arrive at the web, a bar actuating the lever, and blocks on the belt of the railway, which swing the bar, whereby the needle-jaws are locked and unlocked on the two carriages, respectively, substantially as specified.

19. In an embroidering-machine, the combination, with the needle-carriages and their needle-clamping jaws, of levers carrying the movable jaws, cams actuating said levers to lock and unlock the clamps, levers operating the cams, connecting-bars pivotally attached to said levers, centrally-mounted levers near each end of the web engaging with the connecting-bars as the carriages are arrested, and a block on the belt actuating the lever, substantially as specified, whereby the needles are locked in the receiving-carriage an instant before they are released from the other carriage.

20. In an embroidering-machine, the combination, with the stencil-feeding mechanism, of an electro-magnet by the attraction of which the stencil-pulley is locked to its shaft, a switch closed by the advance of the stencil and making the circuit of said magnet, and a second switch in the same circuit closed by the retrograde movement of the needle-carriage and broken after the switch is closed by the stencil, substantially as specified.

21. In an embroidering-machine, the combination, with the railway-reversing mechanism and the electro-magnetic devices whereby the said mechanism is brought into action, of a switch making and breaking the circuits of said devices, said switch consisting of separate contacts separately mounted on an insulating-support, and a second contact moving on the separate contacts, the latter being thrown against the roll and presenting alternating insulated surfaces to the roll, substantially as specified.

In testimony whereof I affix my signature in presence of two witnesses.

ROSWELL T. SMITH.

Witnesses:
CHAS. B. TILDEN,
VINTON COOMBS.